United States Patent
Yang et al.

(10) Patent No.: US 11,530,753 B1
(45) Date of Patent: Dec. 20, 2022

(54) DOUBLE-VALVE CONTINUOUS CIRCULATING VALVE WITH A CLAMPING DEVICE

(71) Applicant: Southwest Petroleum University, Chengdu (CN)

(72) Inventors: Huohai Yang, Chengdu (CN); Xuanyu Liu, Chengdu (CN); Binghong Xie, Chengdu (CN); Jie Yue, Chengdu (CN); Jingxin Ruan, Chengdu (CN); Xing Liu, Chengdu (CN)

(73) Assignee: Southwest Petroleum University, Chengdu (CN)

( * ) Notice: Subject to any disclaimer, the term of this patent is extended or adjusted under 35 U.S.C. 154(b) by 0 days.

(21) Appl. No.: 17/742,274

(22) Filed: May 11, 2022

(30) Foreign Application Priority Data

Sep. 8, 2021 (CN) .......................... 202111046676.0

(51) Int. Cl.
| | |
|---|---|
| *F16K 11/10* | (2006.01) |
| *E21B 34/00* | (2006.01) |
| *E21B 21/10* | (2006.01) |

(52) U.S. Cl.
CPC ........... *F16K 11/105* (2013.01); *E21B 21/106* (2013.01); *E21B 34/00* (2013.01); *Y10T 137/7856* (2015.04)

(58) Field of Classification Search
CPC ...... E21B 19/165; E21B 21/10; E21B 21/106; E21B 33/068
See application file for complete search history.

(56) References Cited

U.S. PATENT DOCUMENTS

| | | | | |
|---|---|---|---|---|
| 1,491,986 | A * | 4/1924 | Greene | ................... E21B 17/04 137/605 |
| 2004/0250858 | A1* | 12/2004 | Steerman | .............. F16K 15/025 137/540 |
| 2006/0278434 | A1* | 12/2006 | Calderoni | ............. E21B 21/106 175/320 |
| 2009/0025930 | A1* | 1/2009 | Iblings | ................... E21B 21/12 166/54 |
| 2010/0300543 | A1 | 12/2010 | Braddick | |
| 2016/0222742 | A1* | 8/2016 | Calderoni | ............. E21B 21/106 |
| 2018/0202247 | A1* | 7/2018 | Johnson | .................. E21B 21/08 |

FOREIGN PATENT DOCUMENTS

| | | |
|---|---|---|
| CN | 202745760 U | 2/2013 |
| CN | 103644654 A | 3/2014 |
| CN | 204024540 U | 12/2014 |

(Continued)

*Primary Examiner* — Robert K Arundale

(57) ABSTRACT

The present invention discloses a novel double-valve continuous circulating valve with a clamping device, comprising a main through valve (5), a pup joint body (8), a middle connector (11) and a bypass valve (12); the main through valve seat (4), the main through valve (5) and the main through valve spring (6) are press-fitted in the pup joint body (8) through a main through valve limiting device (1); a bypass valve seat (10) is arranged at the lower side of the pup joint body (8), and the bypass valve (12) is mounted and fixed to the bypass valve seat (10) through a bypass valve limiting device (9); the middle connector (11) is press-fitted on the pup joint body (8) through a clamping device. The present invention solves the technical problems of dangerous incidents caused by the suspension of circulating medium.

4 Claims, 2 Drawing Sheets

(56) References Cited

FOREIGN PATENT DOCUMENTS

| | | | | |
|---|---|---|---|---|
| CN | 204060585 U | | 12/2014 | |
| CN | 104453752 A | | 3/2015 | |
| CN | 204609812 U | | 9/2015 | |
| CN | 205689656 U | | 11/2016 | |
| CN | 210800159 U | | 6/2020 | |
| CN | 112554822 A | * | 3/2021 | ........... E21B 21/103 |
| CN | 212705263 U | | 3/2021 | |
| SU | 1071733 A1 | | 2/1984 | |

* cited by examiner

DOUBLE-VALVE CONTINUOUS CIRCULATING VALVE WITH A CLAMPING DEVICE

CROSS-REFERENCE TO RELATED APPLICATIONS

The application claims priority to Chinese patent application No. 202111046676.0, filed on Sep. 8, 2021, the entire contents of which are incorporated herein by reference.

TECHNICAL FIELD

The present invention pertains to the technical field of oil drilling, in particular to a novel double-valve continuous circulating valve with a clamping device.

BACKGROUND

In the drilling process, the circulation of the circulating medium for drilling will be stopped when a single drill pipe or stand is picked up or broken out, resulting in downhole pressure fluctuation which will lead to dangerous incidents such as well kick, sticking of tool, wellbore instability, overflow, and cuttings settlement. To address these issues, a continuous circulating valve is applied to ensure smooth circulation of the circulating medium in the replacement of stand and drill string, thus effectively overcoming downhole pressure fluctuation caused by pump startup/shutdown, reducing the cost of drilling and the occurrence probability of dangers, and effectively shortening the drilling cycle in under-balanced, high-temperature and high-pressure, over-balanced and horizontal wells.

The patent CN201710065100.6 discloses a circulating valve, in particular to a continuous circulating valve. The continuous circulating valve consists of a upper joint, a lower joint, a housing and a valve element shaft; the upper joint is threaded at one end of the housing, and the lower joint is threaded at the other end; the valve element shaft is provided in the housing between the upper and lower joints, with one end set with a flange and the other end sleeved with a valve piston through retaining collar A. With simple structure and high practicability, the continuous circulating valve can supply the working fluid to the downhole in a rapid and continuous manner without tripping, which can effectively improve the drilling efficiency while preventing against downhole incidents and solving the existing problems of long non-working period caused by tripping and replacement of the non-continuous circulating valve, as well as serious economic losses caused by reduced drilling efficiency. The continuous circulating valve is particularly applicable to drilling, completion, workover, well flushing, fishing, packer setting, and other operations.

The patent CN201821679799.1 discloses a continuous circulating valve, which belongs to the technical field of downhole tools. The continuous circulating valve is composed of a housing, a main through valve element, a bypass valve element and a valve element shaft. Both ends of the housing are connected with internally and externally threaded drill strings. The valve element shaft is fixedly installed inside the housing with a retaining collar. The main through valve element is installed in the housing at one end of the valve element shaft with a retaining collar and a main through valve seat. A bypass valve hole is made on the housing at one side of the valve element shaft. The bypass valve element is fixed in the bypass valve hole with a bypass valve cover and a retaining collar. With simple structure and high practicability at construction site, the continuous circulating valve enables the continuous pumping of drilling fluid to the downhole by the circulating system without raising the drill string in the drilling process, which solves the problem of the existing problems of long non-working period caused by tripping and replacement of non-continuous circulating valve, thus effectively improving the drilling efficiency while preventing incidents caused by high downhole pressure.

At present, most continuous circulating valves used in major oilfields at home and abroad are ball-plate circulating valves, double-plate circulating valves, guide-rod circulating valves and floating-ball circulating valves, with such disadvantages as the main circulating valve plate is susceptible to erosion by the circulating medium, resulting in failure of the main circulation seal, the torsion spring is susceptible to damage due to prolonged and complex loading, the inclinometer may not be used, and the joint may not be automatically fixed when the bypass valve connector is connected.

It is therefore necessary to design a novel double-valve continuous circulating valve with a clamping device to solve the problems encountered in the drilling process.

SUMMARY

The purpose of the present invention is to overcome the shortcomings of the prior art and provide a novel double-valve continuous circulating valve with a clamping device. The main and bypass circulations can be switched through the main through valve fitted on the pup joint body, the middle connector and the bypass valve, making the flow direction of the circulating medium change automatically, so as to improve the efficiency and safety of the continuous circulating valve. It solves the technical problems of dangerous incidents caused by the suspension of circulating medium.

The purpose of the present invention is achieved by the following technical solutions:

A novel double-valve continuous circulating valve with a clamping device, comprising a main through valve, a pup joint body, a middle connector and a bypass valve, wherein:

The pup joint body is a hollow short shaft, with threaded sections set at both ends;

The main through valve and a main through valve spring are arranged in the pup joint body;

The main through valve is provided with the main through valve spring at the lower end and a main through valve seat at the upper end;

The main through valve seat, the main through valve and the main through valve spring are press-fitted in the pup joint body through a main through valve limiting device;

A stepped hole is arranged at the lower side of the pup joint body, specifically located below the main through valve spring, and a bypass valve seat is provided inside the stepped hole;

The bypass valve is mounted and fixed to the bypass valve seat through a bypass valve limiting device;

The middle connector is arranged outside the bypass valve limiting device;

The middle connector is of round pipe structure and press-fitted on the pup joint body through a clamping device.

Alternatively or preferably, the pup joint body is provided with external threads at upper end and internal threads at lower end, both ends of the pup joint body are threaded to the drill pipe, and the pup joint body is variable in wall thickness at the center.

Alternatively or preferably, the lower end of the pup joint body is of eccentric construction, and the stepped hole is made on the thicker side of the pup joint body to place the bypass valve.

Alternatively or preferably, the main through valve is of a downwardly open cylindrical structure, with a hemispherical structure at the top, a plurality of radial through holes made in the middle, and a toothed structure at the bottom; in case of downhole incident, the hemispherical structure on the top will seal the upper flow channel for internal blowout prevention; the through holes, evenly arranged in the middle of the main through valve, are the flow channels of the circulating medium for the main circulation of circulating medium.

Alternatively or preferably, a limit step is arranged outside the main through valve to match with the main through valve spring, with the outer diameter less than the inner diameter of the pup joint body, so that the main through valve can slide up and down within the pup joint body.

Alternatively or preferably, the main through valve seat is of a round pipe structure, with an arc construction at the bottom to fit the top of the main through valve; the main through valve and the main through valve seat are directly metal-metal sealed.

Alternatively or preferably, the bypass valve limiting device is provided with a circular through hole in the middle, and a plurality of circular slotted flow channels are also arranged beside the through hole for the flow of the circulating medium during bypass circulation.

Alternatively or preferably, the bypass valve has a spherical raised structure in the middle of the end close to the main bypass valve seat, and the spherical raised structure is provided with a guide device to ensure safe and reliable switching; the bypass valve seat is provided with a central through hole that matches with the guide device, and the central through hole is uniformly provided with a plurality of flow channel holes; the bypass valve and the bypass valve seat are directly metal-metal sealed.

Alternatively or preferably, the bypass valve seat, with a round pipe structure, is provided with external threads on the outer cylindrical surface and internal threads in the stepped hole below the pup joint body, and threaded in the stepped hole; the bypass valve seat is provided with an inner bevel face at one end close to the middle connector; the middle connector is provided with an outer bevel face at one end close to the bypass valve seat to ensure the precise matching and connection between the bypass valve seat and the middle connector; an annular seal groove is also made on the outer bevel face of the middle connector, and provided with elastic sealing materials to ensure the sealing reliability between the middle connector and the bypass valve seat.

Alternatively or preferably, the middle connector is provided with a threaded inner bevel face at the end away from the bypass valve seat, allowing for precise alignment with the outer circulating system.

Alternatively or preferably, the clamping device is arranged on the circumferential surface of the pup joint body, and composed of a clamping plate 1 and a clamping plate 2; the clamping plate 1 and the clamping plate 2 are connected at one end with a hinge pin, and connected at other end with a nut, a gasket and a bolt; the clamping plate 1 and clamping plate 2 form a hoop structure, and the circumferential wall of the clamping plate 1 is provided with a through hole that can match with the middle connector; the clamping device can provide a radial pressure on the pup joint body after connection to achieve circumferential locking, and can be quickly removed from the pup joint body upon the completion of the bypass circulation.

Alternatively or preferably, a main through valve seal ring is provided between the main through valve seat and the pup joint body.

Alternatively or preferably, a bypass valve spring is provided between the bypass valve and the bypass valve limiting device, which is Series B composite disk spring that is composed of multiple sets of stacked disc springs; each set consists of two disks, featuring small height, high stiffness and strong cushioning and vibration absorption effect, and withstanding heavy load with small deformation; it is applicable for the limitation that the axial distance between the middle connector and the bypass valve is too short, and a single disc spring can be also better utilized.

Alternatively or preferably, an elastic retaining collar is arranged in the main through valve limiting device to support the main through valve limiting device and avoid the rotation of the main through valve limiting device relative to the main through valve.

According to the above technical solutions, the following technical effects can be achieved:

(1) The present invention can automatically switch the opening and closing of the main through valve and the bypass valve according to the pressure on the main channel and the bypass channel and the flow direction of the circulating medium, so as to switch the main and bypass circulations, thereby improving the working efficiency and safety of the continuous circulating valve;

(2) The main through valve of the present invention has a hemispherical structure on the top, and in case of downhole incident, which will seal the upper flow channel for internal blowout prevention;

(3) The pup joint body of the present invention is externally provided with a clamping device to ensure that the pipe will not be squeezed out under the action of internal and external pressure difference when the bypass circulation is started;

(4) The clamping device of the present invention has a hoop structure, allowing the clamping device to be quickly removed from the continuous circulating valve when the bypass circulation is ended.

BRIEF DESCRIPTION OF DRAWINGS

In order to explain the embodiments of the present invention or the technical solutions in the prior art more clearly, the following will make a brief introduction to the drawings needed in the description of the embodiments or the prior art. Obviously, the drawings in the following description are merely some embodiments of the present invention. For those of ordinary skill in the art, other drawings can be obtained based on the structures shown in these drawings without any creative effort.

The explanation of serial numbers in the figure is as follows: 1—Main through valve limiting device, 2—Elastic retaining collar, 3—Main through valve seal ring, 4—Main through valve seat, 5—Main through valve, 6—Main through valve spring, 7—Clamping plate 1, 8—Pup joint body, 9—Bypass valve limiting device, 10—Bypass valve seat, 11—Middle connector, 12—Bypass valve, 13—Bypass valve spring, 14—Clamping plate 2, 15—Nut, 16—Gasket, 17—Hinge pin, and 18—Bolt.

DETAILED DESCRIPTION OF THE EMBODIMENTS

It is to be understood that the preferred embodiments described herein are only used to interpret the present invention and are not intended to limit the present invention.

The technical solutions of the embodiments of the present invention will be described expressly and integrally in conjunction with the appended figures of the embodiments of the present invention. It is clear that the described embodiments are some but not all of the embodiments of the present invention. According to the embodiments of the present invention, all other embodiments obtained by those of ordinary skill in the art without creative effort fall within the protection scope of the present invention.

Embodiment 1

Figure 1:
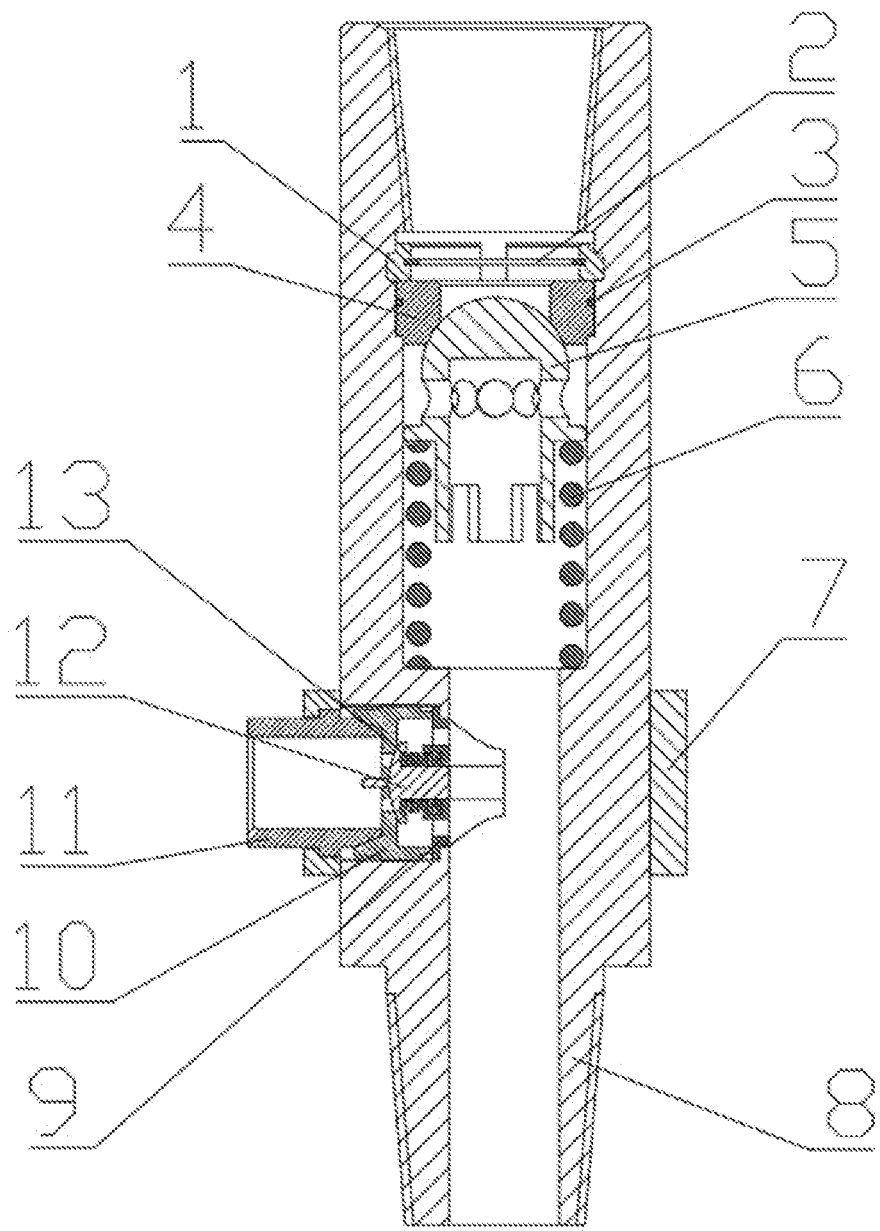
FIG. 1 is a schematic structural diagram (sectional view) of the present invention.
Figure 2:
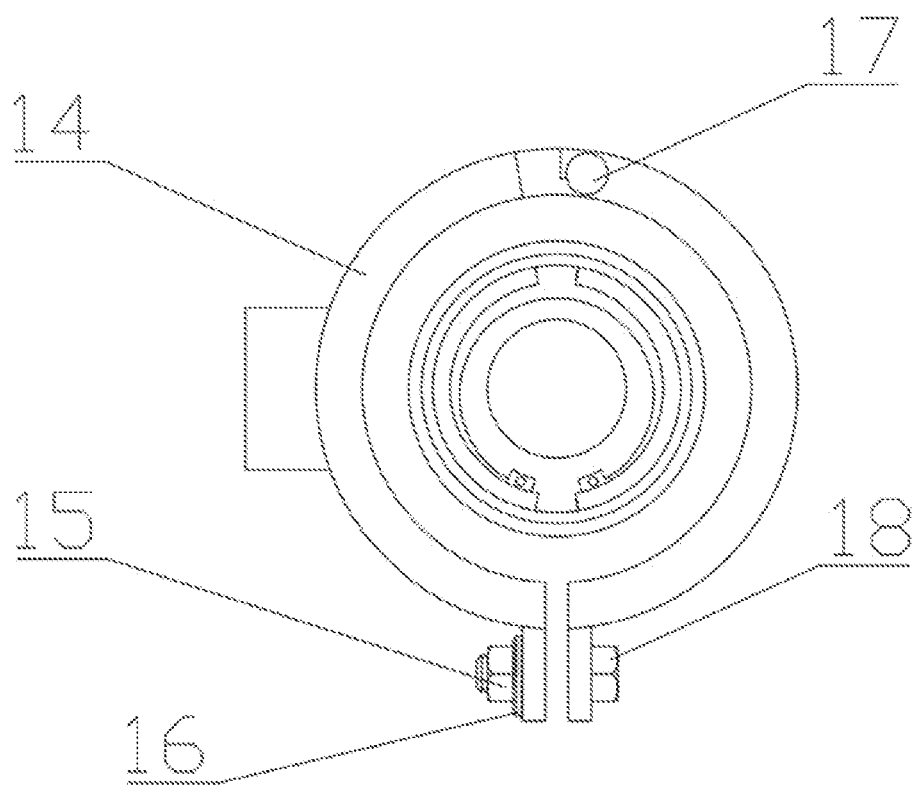
FIG. 2 is a schematic structural diagram (top view) of the present invention.

As shown in FIG. 1 and FIG. 2.

A novel double-valve continuous circulating valve with a clamping device, comprising a main through valve (5), a pup joint body (8), a middle connector (11) and a bypass valve (12), wherein:

The pup joint body (8) is a hollow short shaft, with threaded sections set at both ends;

The main through valve (5) and a main through valve spring (6) are arranged in the pup joint body (8);

The main through valve (5) is provided with the main through valve spring (6) at the lower end and a main through valve seat (4) at the upper end;

The main through valve seat (4), the main through valve (5) and the main through valve spring (6) are press-fitted in the pup joint body (8) through a main through valve limiting device (1);

A stepped hole is arranged at the lower side of the pup joint body (8), specifically located below the main through valve spring (6), and a bypass valve seat (10) is provided inside the stepped hole;

The bypass valve (12) is mounted and fixed to the bypass valve seat (10) through a bypass valve limiting device (9);

The middle connector (11) is arranged outside the bypass valve limiting device (9);

The middle connector (11) is of round pipe structure and press-fitted on the pup joint body (8) through a clamping device.

In this embodiment, the pup joint body (8) is provided with external threads at upper end and internal threads at lower end, both ends of the pup joint body (8) are threaded to the drill pipe, and the pup joint body (8) is variable in wall thickness at the center.

In this embodiment, the clamping device is arranged on the circumferential surface of the pup joint body (8), and composed of a clamping plate 1 (7) and a clamping plate 2 (14); the clamping plate 1 (7) and the clamping plate 2 (14) are connected at one end with a hinge pin (17), and connected at other end with a nut (15), a gasket (16) and a bolt (18).

In this embodiment, a main through valve seal ring (3) is provided between the main through valve seat (4) and the pup joint body (8).

In this embodiment, a bypass valve spring (13) is provided between the bypass valve (12) and the bypass valve limiting device (9).

In this embodiment, an elastic retaining collar (2) is arranged in the main through valve limiting device (1).

This embodiment has the following advantages:

(1) The present invention can automatically switch the opening and closing of the main through valve (5) and the bypass valve (12) according to the pressure on the main channel and the bypass channel and the flow direction of the circulating medium, so as to switch the main and bypass circulations, thereby improving the working efficiency and safety of the continuous circulating valve;

(2) The pup joint body (8) of the present invention is externally provided with a clamping device to ensure that the pipe will not be squeezed out under the action of internal and external pressure difference when the bypass circulation is started.

Embodiment 2

A novel double-valve continuous circulating valve with a clamping device, comprising a main through valve (5), a pup joint body (8), a middle connector (11) and a bypass valve (12), wherein:

The pup joint body (8) is a hollow short shaft, with threaded sections set at both ends;

The main through valve (5) and a main through valve spring (6) are arranged in the pup joint body (8);

The main through valve (5) is provided with the main through valve spring (6) at the lower end and a main through valve seat (4) at the upper end;

The main through valve seat (4), main through valve (5) and main through valve spring (6) are press-fitted in the pup joint body (8) through a main through valve limiting device (1);

A stepped hole is arranged at the lower side of the pup joint body (8), specifically located below the main through valve spring (6), and a bypass valve seat (10) is provided inside the stepped hole;

The bypass valve (12) is mounted and fixed to the bypass valve seat (10) through a bypass valve limiting device (9);

A middle connector (11) is arranged outside the bypass valve limiting device (9);

The middle connector (11) is of round pipe structure and press-fitted on the pup joint body (8) through a clamping device.

In this embodiment, the pup joint body (8) is provided with external threads at upper end and internal threads at lower end, both ends of the pup joint body (8) are threaded to the drill pipe, and the pup joint body (8) is variable in wall thickness at the center.

In this embodiment, the lower end of the pup joint body (8) is of eccentric construction, and the stepped hole is made on the thicker side of the pup joint body (8) to place the bypass valve (12).

In this embodiment, the main through valve (5) is of a downwardly open cylindrical structure, with a hemispherical structure at the top, a plurality of radial through holes made in the middle, and a toothed structure at the bottom; in case of downhole incident, the hemispherical structure on the top will seal the upper flow channel for internal blowout prevention; the through holes, evenly arranged in the middle of the main through valve (5), are the flow channels of the circulating medium for the main circulation of circulating medium.

In this embodiment, a limit step is arranged outside the main through valve (5) to match with the main through valve spring (6), with the outer diameter less than the inner diameter of the pup joint body (8), so that the main through valve (5) can slide up and down within the pup joint body (8).

In this embodiment, the main through valve seat (4) is of a round pipe structure, with an arc construction at the bottom to fit the top of the main through valve (5); the main through valve (5) and the main through valve seat (4) are directly metal-metal sealed.

In this embodiment, the bypass valve limiting device (9) is provided with a circular through hole in the middle, and a plurality of circular slotted flow channels are also arranged beside the through hole for the flow of the circulating medium during bypass circulation.

In this embodiment, the bypass valve (12) has a spherical raised structure in the middle of the end close to the main bypass valve seat (4), and the spherical raised structure is provided with a guide device to ensure safe and reliable switching; the bypass valve seat (10) is provided with a central through hole that matches with the guide device, and the central through hole is uniformly provided with a plurality of flow channel holes; the bypass valve (12) and the bypass valve seat (4) are directly metal-metal sealed.

In this embodiment, the bypass valve seat (10), with a round pipe structure, is provided with external threads on the outer cylindrical surface and internal threads in the stepped hole below the pup joint body (8), and threaded in the stepped hole; the bypass valve seat (10) is provided with an inner bevel face at one end close to the middle connector (11); the middle connector (11) is provided with an outer bevel face at one end close to the bypass valve seat (10) to ensure the precise matching and connection between the bypass valve seat (10) and the middle connector; an annular seal groove is also made on the outer bevel face of the middle connector (11), and provided with elastic sealing materials to ensure the sealing reliability between the middle connector (11) and the bypass valve seat (10).

In this embodiment, the middle connector (11) is provided with a threaded inner bevel face at the end away from the bypass valve seat (10), allowing for precise alignment with the outer circulating system.

In this embodiment, the clamping device is arranged on the circumferential surface of the pup joint body (8), and composed of a clamping plate 1 (7) and a clamping plate 2 (14); the clamping plate 1 and the clamping plate 2 are connected at one end with a hinge pin (17), and connected at other end with a nut (15), a gasket (16) and a bolt (18); the clamping plate 1 (7) and the clamping plate 2 (14) form a hoop structure, and the circumferential wall of the clamping plate 1 (7) is provided with a through hole that can match with the middle connector (11); the clamping device can provide a radial pressure on the pup joint body (8) after connection to achieve circumferential locking, and can be quickly removed from the pup joint body (8) upon the completion of the bypass circulation.

In this embodiment, a main through valve seal ring (3) is provided between the main through valve seat (4) and the pup joint body (8).

In this embodiment, a bypass valve spring (13) is provided between the bypass valve (12) and the bypass valve limiting device (9), which is Series B composite disk spring that is composed of multiple sets of stacked disc springs; each set consists of two disks, featuring small height, high stiffness and strong cushioning and vibration absorption effect, and withstanding heavy load with small deformation; it is applicable for the limitation that the axial distance between the middle connector (11) and the bypass valve (12) is too short, and a single disc spring can be also better utilized.

In this embodiment, an elastic retaining collar (2) is arranged in the main through valve limiting device (1) to support the main through valve limiting device (1) and avoid the rotation of the main through valve limiting device (1) relative to the main through valve (5).

This embodiment has the following advantages:

(1) The present invention can automatically switch the opening and closing of the main through valve (5) and the bypass valve (12) according to the pressure on the main channel and the bypass channel and the flow direction of the circulating medium, so as to switch the main and bypass circulations, thereby improving the working efficiency and safety of the continuous circulating valve;

(2) The main through valve (5) of the present invention has a hemispherical structure on the top, and in case of downhole incident, which will seal the upper flow channel for internal blowout prevention;

(3) The pup joint body (8) of the present invention is externally provided a clamping device to ensure that the pipe will not be squeezed out under the action of internal and external pressure difference when the bypass circulation is started;

(4) The clamping device of the present invention has a hoop structure, allowing the clamping device to be quickly removed from the continuous circulating valve when the bypass circulation is ended.

What is claimed is:

1. A novel double-valve continuous circulating valve with a clamping device, comprising a main through valve (5), a pup joint body (8), a middle connector (11) and a bypass valve (12), wherein:
   the pup joint body (8) is a hollow shaft, with threaded sections set at a lower end and at an upper end;
   the main through valve (5) and a main through valve spring (6) are arranged in the pup joint body (8);
   the main through valve (5) is provided with the main through valve spring (6) at the lower end and a main through valve seat (4) at the upper end;
   the main through valve seat (4), the main through valve (5) and the main through valve spring (6) are press-fitted in the pup joint body (8) by a main through valve limiting device (1);
   the main through valve (5) has a hemispherical structure on top, a plurality of radial through holes made in middle, and a toothed structure at bottom; a limit step is arranged outside the main through valve (5) to match with the main through valve spring (6), with an outer diameter less than the inner diameter of the pup joint body (8), so that the main through valve (5) can slide up and down within the pup joint body (8);
   A stepped hole is arranged at a lower side of the pup joint body (8), specifically located below the main through valve spring (6), and a bypass valve seat (10) is provided inside the stepped hole;
   the bypass valve (12) is mounted and fixed to the bypass valve seat (10) through a bypass valve limiting device (9);
   the middle connector (11) is arranged outside the bypass valve limiting device (9); the bypass valve (12) has a spherical raised structure in middle of one end of the bypass valve (12), and the spherical raised structure is provided with a guide device; a composite disk spring is provided between the bypass valve (12) and the bypass valve limiting device (9), and the composite disk spring is composed of multiple sets of stacked disc springs;

the middle connector (11) is of round pipe structure and press-fitted on the pup joint body (8) through a clamping device;

the clamping device is arranged on the circumferential surface of the pup joint body (8), and composed of a clamping plate 1 (7) and a clamping plate 2 (14) connected with each other using a hinge pin (17), a nut (15), a gasket (16) and a bolt (18).

2. The novel double-valve continuous circulating valve with a clamping device according to claim 1, wherein the threaded sections include external threads at the upper end and internal threads at the lower end, both the ends of the pup joint body (8) are threaded to the drill pipe, and the pup joint body (8) is variable in wall thickness at the center.

3. The novel double-valve continuous circulating valve with a clamping device according to claim 1, wherein a main through valve seal ring (3) is provided between the main through valve seat (4) and the pup joint body (8).

4. The novel double-valve continuous circulating valve with a clamping device according to claim 1, wherein an elastic retaining collar (2) is arranged in the main through valve limiting device (1).

* * * * *